(12) United States Patent
Symes (10) Patent No.: US 10,057,568 B2
(45) Date of Patent: Aug. 21, 2018

(54) PARALLEL PARSING VIDEO DECODER AND METHOD

(71) Applicant: ARM Limited, Cambridge (GB)

(72) Inventor: Dominic Hugo Symes, Cambridge (GB)

(73) Assignee: ARM Limited, Cambridge (GB)

(*) Notice: Subject to any disclaimer, the term of this patent is extended or adjusted under 35 U.S.C. 154(b) by 1225 days.

(21) Appl. No.: 13/863,607

(22) Filed: Apr. 16, 2013

(65) Prior Publication Data

US 2013/0322550 A1 Dec. 5, 2013

(30) Foreign Application Priority Data

Jun. 1, 2012 (GB) .................................. 1209831.5

(51) Int. Cl.
*H04N 7/12* (2006.01)
*H04N 11/02* (2006.01)
(Continued)

(52) U.S. Cl.
CPC ..... *H04N 19/00945* (2013.01); *H04N 19/436* (2014.11); *H04N 19/44* (2014.11)

(58) Field of Classification Search
CPC ............................................... H04N 19/00945
(Continued)

(56) References Cited

U.S. PATENT DOCUMENTS

2003/0023982 A1* 1/2003 Lee ................ H04N 21/234327
725/116
2003/0189982 A1* 10/2003 MacInnis ............. H04N 19/176
375/240.24
(Continued)

FOREIGN PATENT DOCUMENTS

EP 1 355 499 10/2003
WO WO 2012169952 A2 * 12/2012 ............. H04N 19/70

OTHER PUBLICATIONS

Corrected UK Search Report for GB Application No. 1209831.5, dated Sep. 28, 2012, 3 pages.
(Continued)

*Primary Examiner* — Mohammed Rahaman
*Assistant Examiner* — Richard A Hansell, Jr.
(74) *Attorney, Agent, or Firm* — Nixon & Vanderhye P.C.

(57) ABSTRACT

A video decoding apparatus for decoding an encoded video bitstream having a sequence of video pictures, wherein at least one video picture is encoded in a plurality of slices, wherein each slice comprises a sequence of raster scan order blocks which can be decoded independently of another slice. The video decoding apparatus comprises: an array store configured to store an array of values, with an array entry corresponding to each block position in the video picture, such that each block position has its own corresponding array entry; a plurality of parsing units each configured to perform a parsing operation on a selected sequence of raster scan order blocks in a selected slice and to write a value to a selected array entry corresponding to a first block in the selected sequence, the value indicating a location of parsed data generated by the parsing operation and required to render the selected sequence of blocks; and a rendering unit configured to render the video pictures using the parsed data with reference to the values written to the array store, wherein the plurality of parsing units are configured to perform their respective parsing operations on the plurality of slices in parallel with each other.

20 Claims, 9 Drawing Sheets (51) Int. Cl.
*H04N 11/04* (2006.01)
*H04N 19/90* (2014.01)
*H04N 19/44* (2014.01)
*H04N 19/436* (2014.01)

(58) Field of Classification Search
USPC .................................................. 375/240.26
See application file for complete search history.

(56) References Cited

U.S. PATENT DOCUMENTS

| | | | | |
|---|---|---|---|---|
| 2004/0151252 | A1* | 8/2004 | Sekiguchi | H03M 7/40 375/240.25 |
| 2008/0232478 | A1* | 9/2008 | Teng | H04N 19/00939 375/240.27 |
| 2011/0182359 | A1* | 7/2011 | Chen | H04N 19/44 375/240.13 |
| 2011/0194613 | A1* | 8/2011 | Chen | H04N 19/176 375/240.24 |
| 2012/0014816 | A1 | 1/2012 | Choi et al. | |
| 2012/0140816 | A1* | 6/2012 | Franche | H04N 19/172 375/240.03 |
| 2012/0230398 | A1* | 9/2012 | Segall | H04N 19/176 375/240.08 |
| 2013/0016771 | A1* | 1/2013 | Misra | H04N 19/176 375/240.03 |

OTHER PUBLICATIONS

Zhao, J. et al., "Parallel entropy decoding for high resolution video coding", Visual Communications and Image Processing, vol. 7257, (2009), 11 pages.

Wiegand, T. et al., "Overview of the H.264/AVC Video Coding Standard", IEEE Transactions on Circuits for Video Technology, vol. 13, No. 7, (Jul. 2003), 17 pages.

UK Search Report for GB Application No. 1209831.5, dated Sep. 28, 2012, 3 pages.

* cited by examiner

PARALLEL PARSING VIDEO DECODER AND METHOD

The present invention relates to video decoding. In particular the present invention relates to the parallelisation of the video decoding process.

BACKGROUND

The decoding of video data encoded according to a contemporary video coding standard such as H.264/AVC or according to a planned video coding standard such as HEVC is known to be a computationally intensive task. Accordingly various techniques are known to enhance the throughput and efficiency of this decoding.

One known technique is for the decoding task to be split into two separate phases, namely a first parsing phase in which the encoded video bitstream is interpreted to derive macroblock-based information therefrom and a second rendering phase in which the macroblock-based information is rendered into pixel data for display. The division of the decoding process into these two phases, in particular where the macroblock-based information is stored between the phases, enables various performance improvements to be made, for example by at least partially decoupling the throughput of each phase from each other. Furthermore this separation enables additional improvements to be made, such as those disclosed in UK patent application 1013625.7, the entire contents of which are incorporated herein by reference, wherein the parsing can take place in bitstream macroblock order, whilst the rendering can take place in raster scan macroblock order, thus enabling each process to operate in the order it is most efficiently suited to.

Another known technique derives from a feature of standards such as H.264/AVC which allows an individual picture to be encoded as several independent "slices" (consecutive raster scan order sequences of macroblocks). The independence of these slices means that much of their decoding can be distributed amongst more than one decoding unit, with separate slices being reconstructed to pixels in parallel, with a final de-blocking pass being used as required to smooth across slice boundaries. A disadvantage of the additional de-blocking pass is the additional memory bandwidth which it consumes. An overview of the H.264/AVC standard, including the slice aspect thereof, can be found in "Overview of the H.264/AVC Video Coding Standard", Thomas Wiegand, et al., IEEE Transactions on Circuits and Systems for Video Technology, Vol. 13, No. 7, July 2003.

The paper "Parallel entropy decoding for high resolution video coding", J. Zhao and A. Segall, Visual Communications and Image Processing 2009, introduces the concept of an "entropy slice" where the entropy decoding operation for each slice is independent, but for pixel reconstruction the pixels are permitted to be predicted from neighbouring slices, the aim being to increase the compression quality of the video standard.

In general, a challenge connected with the parallel parsing of separate slices in the encoded video bitstream is the requirement for the separate parsing units to operate in coordination with one another. One way of ensuring that the separate parsing units do not conflict with one another is to provide a lock-based mechanism. For example, each parsing unit may be configured to set a lock for the row in which it is currently interpreting macroblocks to ensure that conflicts with another parsing unit seeking to process other macroblocks in that row do not occur. However, such lock-based mechanisms not only require additional overhead to administer, but also introduce inefficiencies such as the latency imposed on another system component whilst waiting for a particular lock to be cleared.

Accordingly, it would be desirable to provide an improved technique for carrying out the parallel parsing of slices in encoded video.

SUMMARY

Viewed from a first aspect, the present invention provides a video decoding apparatus for decoding an encoded video bitstream, said encoded video bitstream representing a sequence of video pictures, wherein at least one video picture of said sequence of video pictures is encoded in said encoded video bitstream in a plurality of slices, wherein each slice comprises a sequence of raster scan order blocks which can be decoded independently of another slice, said video decoding apparatus comprising:

an array store configured to store an array of values, said array comprising an array entry corresponding to each block position in said at least one video picture, such that each block position has its own corresponding array entry;

a plurality of parsing units, each parsing unit configured to perform a parsing operation on a selected sequence of raster scan order blocks in a selected slice and to write a value to a selected array entry in said array corresponding to a first block in said selected sequence, said value indicating a location of parsed data generated by said parsing operation and required to render said selected sequence of blocks; and a rendering unit configured to render said video pictures using said parsed data with reference to said values written to said array store, wherein said plurality of parsing units are configured to perform their respective parsing operations on said plurality of slices in parallel with each other.

According to the present techniques a video decoding apparatus is provided which is configured to perform parallelised decoding of an encoded video bitstream. The encoded video bitstream represents a sequence of video pictures, at least one of which is encoded in a plurality of slices and each slice comprises a sequence of blocks in raster scan order. These blocks may take a number of forms, such as for example 16×16 pixel macroblocks (in the example of an H.264/AVC implementation) or 64×64 treeblocks (in the example of an HEVC implementation). Parallelisation of the decoding process is enabled by the provision of a plurality of parsing units, each of which performs a parsing operation on a selected slice in the encoded video bitstream. More particularly, each parsing unit performs its parsing operation on a selected sequence of raster scan order blocks taken from its allocated slice. This selected sequence could in principle be an entire slice, but may also be a smaller subdivision of the slice such as a single row (or part row) from the slice. The parsing operation performed by each parsing unit generates parsed data which the rendering unit can then transform ("render") into the required pixel data for display of the decoded video pictures.

To facilitate both the coordination amongst the plurality of parsing units themselves, and the coordination between the parsing unit and the rendering unit, the video decoding apparatus is provided with an array store in which an array of values can be stored. In particular, an array entry is provided corresponding to each block position in the video picture. Accordingly each block position has its own array entry, i.e. each block position is uniquely identified by a given array entry. The parsing units make use of this array when parsing their selected sequence of blocks by writing a value into the array at a position corresponding to the first block in that selected sequence. This value indicates the location of the parsed data generated by that parsing operation. Because there is an array entry (i.e. position) corresponding to each block position, the need for a lock mechanism between the parsing units is avoided, since each parsing unit can simply access the array entry at the start of the selected sequence it is parsing without the need to, say, lock down an entire row of blocks. Furthermore, the provision of this array also provides an efficient communication mechanism between the parsing units and the rendering unit, since the rendering unit can determine the availability of the parsed data corresponding to a particular selected sequence merely by examining the array entry corresponding to the first block in that sequence.

Hence, a two-fold reduction in latency within the video decoding apparatus is supported. On the one hand the parsing units are able to operate fully in parallel with one another, without having to wait for locks to clear. On the other hand the renderer is able to begin rendering the parsed data as soon as it is available. Previously, mechanisms such as a "y pointer" have been used to indicate to the renderer the extent to which a video picture has been parsed, but the granularity restrictions of that approach (i.e. row-wise or double row-wise, depending on the implementation) means that parsed data may be in principle available for rendering, but is not accessible to the renderer until the y pointer is moved on.

The value indicating the location of parsed data that is written to the selected array entry could take a number of forms, but in one embodiment said value comprises a pointer configured to point to a strip descriptor, said strip descriptor comprising configuration information necessary to render said selected sequence of raster scan order blocks. The use of a pointer is a compact and efficient mechanism to maintain the array in an easily administered format whilst the strip descriptor (stored separately) for the selected sequence can contain detailed information required by the renderer (e.g. memory locations and size of the header and residual information, slice identification information and so on).

It will be appreciated that the strip descriptor could indicate a range of information required by the renderer, but in one embodiment said strip descriptor indicates a width of said selected sequence of raster scan order blocks. The width of the selected sequence of raster scan order blocks (i.e. the number of blocks in the selected sequence) is of particular benefit to the renderer, since this not only defines the extent of the current selected sequence, but also enables the renderer to determine where the next "first block" defining the start of the next selected sequence is to be found.

The pointers generated by the parsing units and stored in the array could take a number of forms, but in one embodiment each parsing unit is configured to generate said pointer having predetermined alignment in memory space. For example, in one embodiment the pointer has a 4-byte alignment. Generating a pointers having this particular format enables a distinction to be made between "valid" pointers (which in this example have the 4-byte alignment) and "non-valid" pointers (which in this example do not have the 4-byte alignment). Hence this allows the reader of the array to interpret information being conveyed by that pointer just from the byte alignment of the pointer itself, without having to following it to its target.

For example, in one embodiment each parsing unit is configured to generate an additional pointer for storage at said selected array entry in said array corresponding to said first block in said selected sequence, wherein said additional pointer has a byte offset from said predetermined alignment, wherein said byte offset is indicative of a status of said selected sequence. Accordingly, a parsing unit can use different offsets of byte alignment of the pointers it stores in the array store to indicate status information of the selected sequence. Hence, this allows the reader of the array to determine this status information related to that selected sequence just from the byte alignment of the pointer itself, without having to following it to its target.

As previously mentioned, an advantage of the provision of the array store comprising an array entry corresponding to each block position in the video picture is that latency in the system can be reduced. For example, in one embodiment said rendering unit is configured to read said array in raster scan order and to begin performance of said rendering process on said selected sequence of raster scan order blocks after said value has been stored at said selected array entry in said array corresponding to said first block in said selected sequence. Accordingly, the rendering unit can begin its rendering process as soon as the corresponding blocks have been parsed, there being no need to wait for a lock to be cleared or the like.

The parsing unit could also make use of the array entry corresponding to the first block in the selected sequence which it is currently processing to indicate to the rendering unit that the rendering process in still on-going. Hence in one embodiment each parsing unit is configured to cause a selected value to be stored at said selected array entry in said array corresponding to said first block in said selected sequence, said selected value indicating that rendering of said selected sequence of raster scan order blocks cannot yet commence.

Hence in such embodiments the rendering unit may be further configured to read said array in raster scan order and, on reading said selected value, to wait until said value indicating said location of said parsed data is stored in said selected array entry in said array corresponding to said first block in said selected sequence.

The selected value which a parsing unit uses to indicate to the rendering unit that the rendering process in still on-going could take a variety of forms, but in one embodiment said selected value is a null pointer.

In one embodiment, each slice is partitioned into data partitions in said encoded video bitstream, and wherein each parsing unit is configured, after having generated parsed data corresponding to a first data partition of said selected sequence of raster scan order blocks, to cause said selected value to indicate that only parsed data corresponding to said first data partition has been generated and stored. For example, the slice may be partitioned into a first data partition carrying header information and a second data partition carrying residual information and the selected value written into the array can communicate to other system components when only the first (header) information has been parsed.

Communicating the fact that the first data partition information has been parsed can for example be of benefit in embodiments in which at least one of said plurality of parsing units is configured to perform a dependent parsing operation which requires said parsed data corresponding to said first data partition. In such an embodiment said at least one of said plurality of parsing units may be configured to perform said dependent parsing operation only after said selected value indicates that said parsed data corresponding to said first data partition has been generated and stored. Hence the content of the array may not only be used to facilitate a lower latency in communication between the parsing units and the rendering unit (as mentioned above), but can also reduce the latency between the parsing units themselves. For example, there may be parsing dependencies between the header information of consecutive pictures in the video sequence. This embodiment thus facilitates a dependent parsing operation (i.e. with respect to a later picture) to begin as soon as the required prior parsing operation (i.e. with respect to an earlier picture) has completed.

The entries in the array may also be used to facilitate error handling. In one embodiment at least one of said plurality of parsing units is configured, if an error condition affecting at least one block occurs whilst performing said parsing operation, to cause an error value to be stored at an array entry in said array corresponding to a first erroneous block of said at least one block, said error value indicating how many blocks are erroneous.

The video decoding apparatus could be configured to respond to such an error condition in a number of ways, but in one embodiment said rendering unit is configured to read said array in raster scan order and, on reading said error value, to perform an error concealment rendering process for said at least one block. Such an arrangement enables the throughput of the video decoding process to be largely unaffected by the occurrence of the error.

In some embodiments said rendering unit is one of a plurality of rendering units, said plurality of rendering units configured to perform respective rendering processes in parallel with one another. Accordingly in addition to the parallelisation of the parsing process, embodiments of the present invention also provide for the parallelisation of the rendering process.

In some embodiments the video decoding apparatus further comprises a control unit configured to allocate said plurality of slices between said plurality of parsing units. This control unit may administer a number of functions, but in one embodiment said control unit receives task completion reports from said plurality of parsing units and is configured, if said task completion reports indicate a gap between any of said plurality of slices, to cause an error value to be stored at an array entry in said array corresponding to a first block of said gap, said error value indicating how many blocks are in said gap. Although the plurality of slices will typically form an uninterrupted concatenation of blocks, by the nature of the parsing process each parsing unit will only be able to definitively indicate where the slice it is handling ends once the parsing for that slice is completed. It is therefore advantageous to configure the control unit to maintain an overview over the respective parsing processes, such that gaps which may erroneously occur between slices can be identified.

In another embodiment said control unit receives task completion reports from said plurality of parsing units and is configured, if said task completion reports indicate a starting position of a next slice overlaps with a previously parsed slice, to initiate a rendering correction procedure, said rendering correction procedure comprising causing said rendering unit to render said previously parsed slice and said next slice so as to eliminate the overlap. The overlapping of two slices in this manner is indicative of a problem in the parsing process, since slices in a video picture are not defined to overlap one another. The control unit thus enables this parsing error to identified and handled, by causing the rendering unit to eliminate the overlap. This could for example be by re-rendering the entire earlier slice, or simply from the point at which the new slice takes over from the earlier slice.

In one embodiment said parsed data generated by said parsing operation comprises intermediate format data, said video decoding apparatus further comprises an intermediate format data store into which each parsing unit is configured to store said intermediate format data, and said rendering unit is configured to render said video pictures using said intermediate format data retrieved from said intermediate format store.

Viewed from a second aspect, the present invention provides a video decoding apparatus for decoding an encoded video bitstream, said encoded video bitstream representing a sequence of video pictures, wherein at least one video picture of said sequence of video pictures is encoded in said encoded video bitstream in a plurality of slices, wherein each slice comprises a sequence of raster scan order blocks which can be decoded independently of another slice, said video decoding apparatus comprising:

array storage means for storing an array of values, said array comprising an array entry corresponding to each block position in said at least one video picture, such that each block position has its own corresponding array entry;

a plurality of parsing means, each parsing means for performing a parsing operation on a selected sequence of raster scan order blocks in a selected slice and to write a value to a selected array entry in said array corresponding to a first block in said selected sequence, said value indicating a location of parsed data generated by said parsing operation and required to render said selected sequence of blocks; and rendering means for rendering said video pictures using said parsed data with reference to said values written to said array storage means, wherein said plurality of parsing means are configured to perform their respective parsing operations on said plurality of slices in parallel with each other.

Viewed from a third aspect, the present invention provides a method of decoding an encoded video bitstream, said encoded video bitstream representing a sequence of video pictures, wherein at least one video picture of said sequence of video pictures is encoded in said encoded video bitstream in a plurality of slices, wherein each slice comprises a sequence of raster scan order blocks which can be decoded independently of another slice, said method comprising the steps of:

storing an array of values in an array store, said array comprising an array entry corresponding to each block position in said at least one video picture, such that each block position has its own corresponding array entry;

performing a parsing operation in each of a plurality of parsing units, said parsing operation being performed on a selected sequence of raster scan order blocks in a selected slice;

writing a value to a selected array entry in said array corresponding to a first block in said selected sequence, said value indicating a location of parsed data generated by said parsing operation and required to render said selected sequence of blocks; and rendering said video pictures using said parsed data with reference to said values written to said array store, wherein said plurality of parsing units are configured to perform their respective parsing operations on said plurality of slices in parallel with each other.

The above, and other objects, features and advantages of this invention will be apparent from the following detailed description of illustrative embodiments which is to be read in connection with the accompanying drawings.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
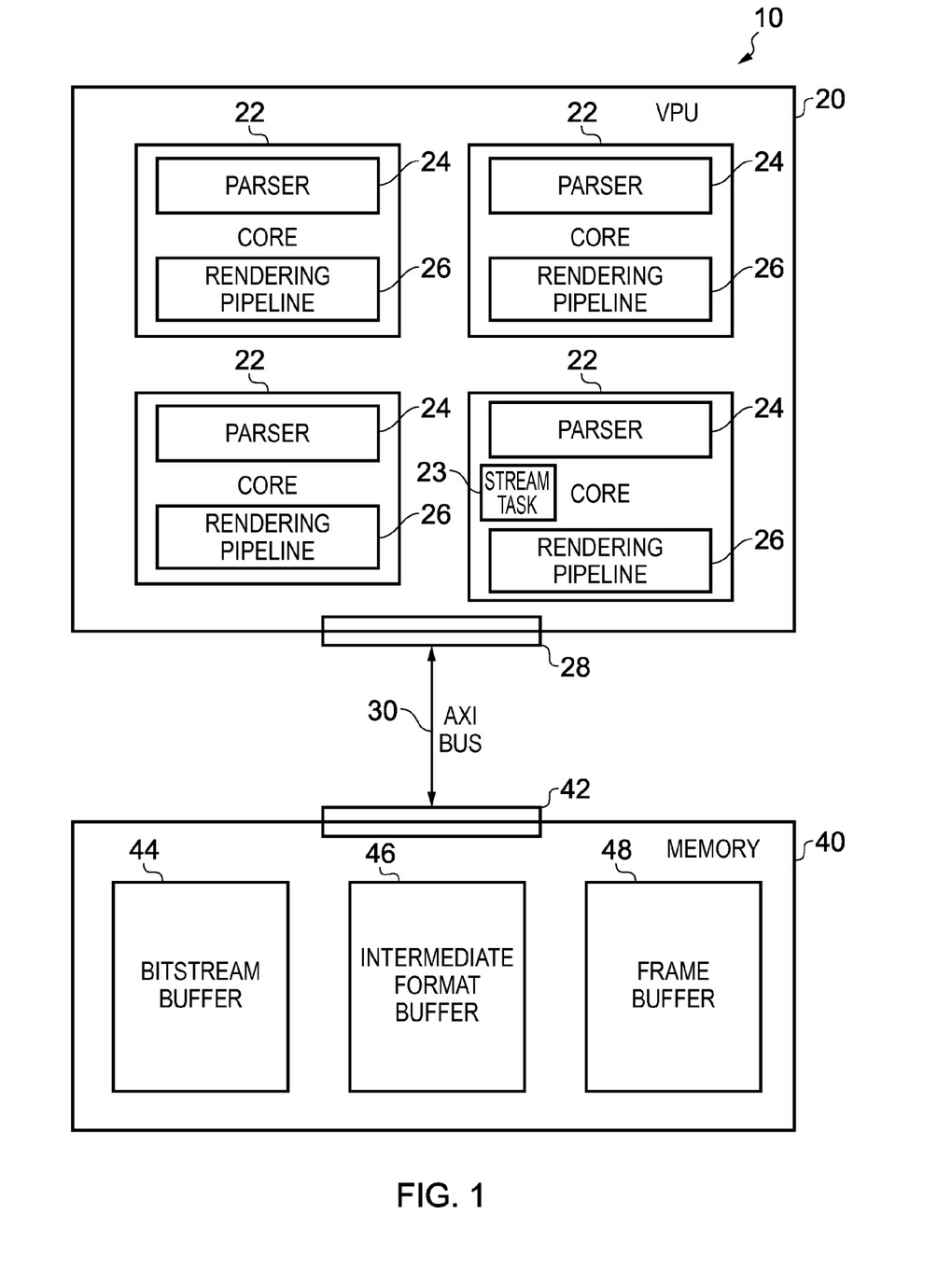
FIG. 1 schematically illustrates the configuration of a video decoding apparatus in one embodiment.

FIG. 1 schematically illustrates a video decoding apparatus in one embodiment. The video decoding apparatus 10 comprises a video processing unit (VPU) 20 coupled by means of a bus 30 to an external memory 40. The VPU 20 comprises four processor cores 22, each of which is configured to independently perform video decoding operations. Two significant components of each core 22 are schematically illustrated in FIG. 1 as parser 24 and rendering pipeline 26. These will be described in more detail with reference to the following figures. The VPU 20 has a bus interface 28 connecting it to the bus 30, which in this example embodiment is an AXI bus as defined by ARM Limited of Cambridge, UK. Similarly, the memory 40 has a bus interface 42 via which it connects to the bus 30. Within the memory 40, three different buffers are illustrated, namely the bit stream buffer 44, the intermediate format buffer 46 and the frame buffer 48. When performing video decoding operations, the video decoding apparatus 10 receives an encoded video bit stream which it temporarily stores in the bit stream buffer 44. Whilst all four processor cores 22 are similarly configured, in operation typically one core will additionally run the stream task 23 as well as the parser, whilst in the other cores only the parser is run. The stream task provides a control unit which administers the overall control of the decoding process, in particular administering the allocation of portions of the encoded video bit stream to the separate processor cores for parsing and rendering.

The parser 24 in each processor core 22 performs a parsing operation on its allocated portion of the encoded video bit stream, the parsed data being written into the intermediate format buffer 46. Subsequently the rendering pipeline 26 in each processor core 22 retrieves parsed data from the intermediate format buffer 46 in order to perform a rendering operation thereon to generate final pixel data for display. This final pixel data is written into frame buffer 48, from where it is retrieved for display (not illustrated).

Figure 2:
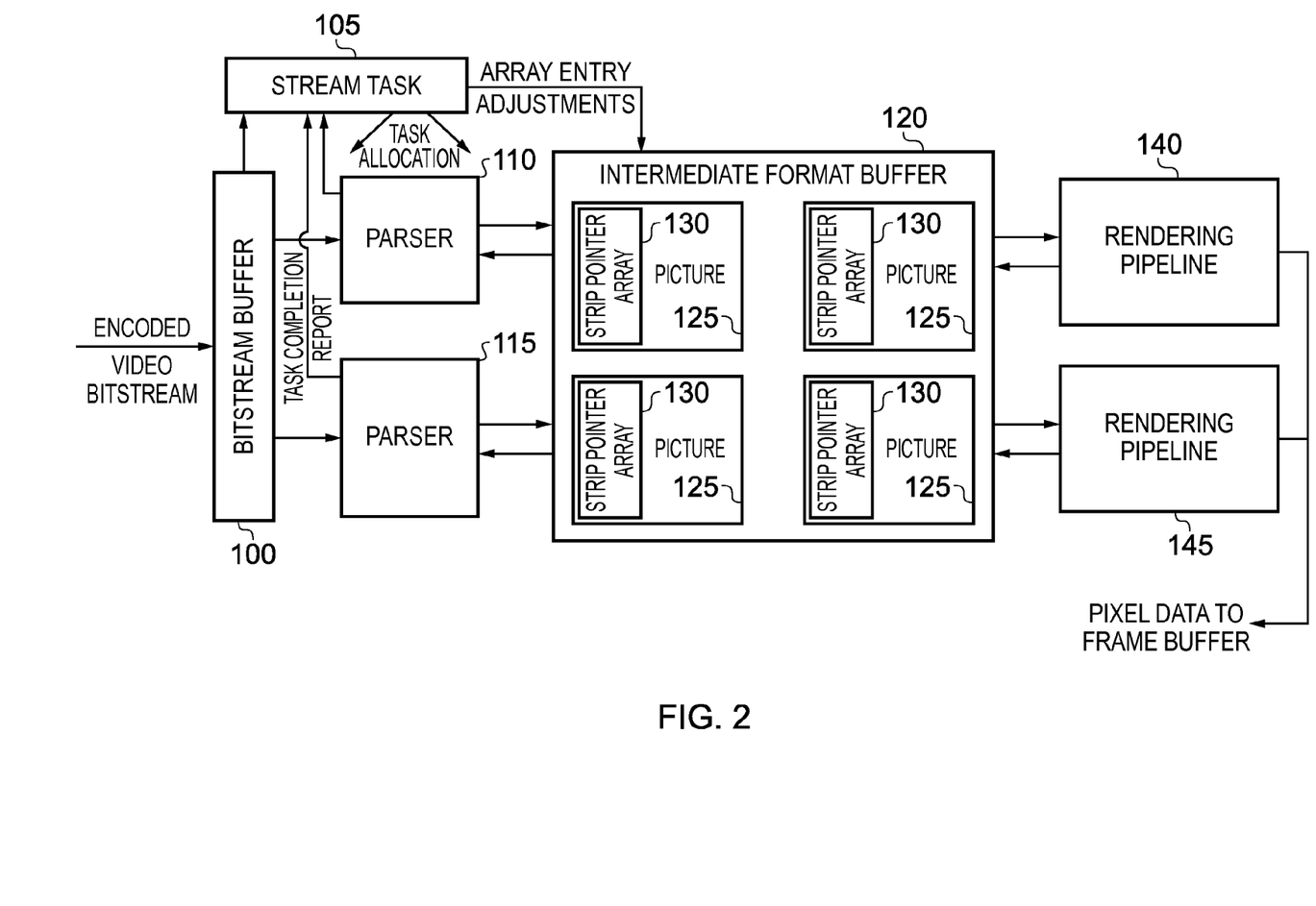
FIG. 2 schematically illustrates in more detail the data flow in a video decoding apparatus in one embodiment.

FIG. 2 schematically illustrates in more detail the flow of data through a video decoding apparatus such as that illustrated in FIG. 1. It should therefore be noted that the layout of the figure is dictated primarily by information flow rather than physical layout of the device. The received encoded video bit stream is temporarily buffered in bit stream buffer 100. Running on one of the processor cores, the stream task 105 monitors the incoming encoded video bit stream and allocates parsing tasks amongst the parsers 110, 115 which are running on respective separate processor cores. In this embodiment, on the basis of header information in the encoded video bit stream, the stream task 105 allocates independent slices within the encoded video bit stream to separate parsing units. Note that only two parsing units (and two rendering pipelines) are illustrated in FIG. 2 for clarity whereas a typical implementation may comprise more parsers and rendering pipelines such as in the four-core embodiment shown in FIG. 1.

Once allocated a slice to parse, each parsing unit 110, 115 then begins retrieving the corresponding encoded video data temporarily buffered in the bit stream buffer 100 and performing its parsing operation. This parsing operation comprises interpreting the encoded video bit stream to extract block-based information which is then stored in the intermediate format buffer 120. Typically, this intermediate format data comprises header and residual information on a block-by-block basis for the particular slice allocated to that parsing unit. This is the information required by a rendering pipeline to reconstruct the corresponding pixel data for display. In the example H.264/AVC embodiment discussed here the "blocks" referred to are macroblocks (each comprising 16×16 pixels), although in other embodiments these "blocks" may be logically larger units of data, such as the "treeblocks" of an HEVC implementation.

Within the intermediate format buffer 120, intermediate format data related to a number of video pictures may be simultaneously stored, as shown by the example four sets of picture data 125 illustrated in FIG. 2. Hence the intermediate format data related to a given video picture is built up in the intermediate format buffer 120, and in the case where that video picture is composed of more than one slice, the intermediate format data corresponding to each slice is separately generated by the respective parsers to which those slices were allocated for parsing Importantly, associated with each set of picture data 125 is a strip pointer array 130 corresponding to that video picture. In particular, the strip pointer array 130 has an array entry corresponding to each block position in the video picture. For example, in an embodiment where each picture is made up of 11×9 macroblocks, the strip pointer array 130 then also has 11×9 possible entries in which values can be stored.

Figure 3A:
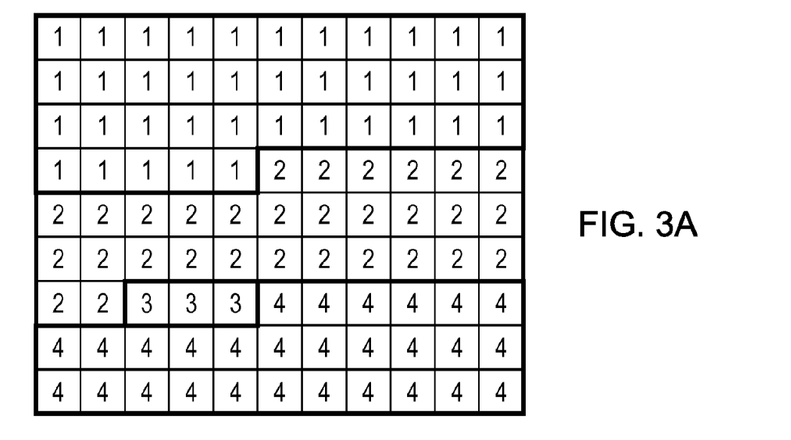
FIG. 3A illustrates the sub-division of a video picture into four slices.
Figure 3B:
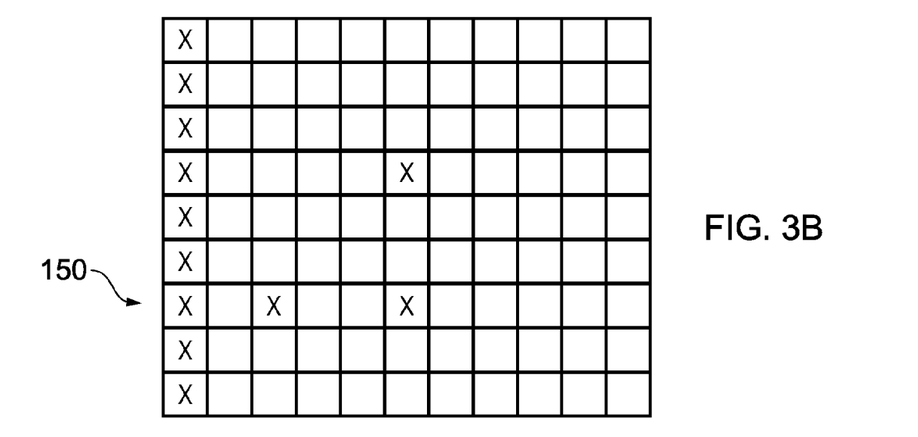
FIG. 3B schematically illustrates the block positions at which values may be stored in the array store in one embodiment corresponding to the slice sub-division shown in FIG. 3A.

Turning to FIGS. 3A and 3B, the function of the strip pointer array is now explained in more detail. FIG. 3A schematically illustrates an example video picture formed of 11×9 macroblocks, wherein the video picture is partitioned into four independent slices. As can be seen in FIG. 3A, these slices (labelled 1-4) are consecutive raster scan order sequences of macro blocks of varying lengths (for example slice "1" is 38 macroblocks long, whilst slice "3" is only 3 macroblocks long). When allocated to a parsing unit, a slice is typically subdivided into a number of "strips" which are then separately parsed, wherein a strip in the illustrated embodiment is taken to be a consecutive sequence of macroblocks within a single row of a slice. Accordingly the parsing operation causes the intermediate format data (the "parsed data") for each strip to be stored in the intermediate format buffer 120, this intermediate format data predominantly comprising macroblock header information and macroblock residual information. Further, the parsing operation also generates a strip descriptor which is also stored in the intermediate format buffer 120 which comprises various items of information related to the parsed strip data, such as the number of macroblocks in the strip, where the macroblock header information is to be found, where the residual information is to be found, and other slice identification information.

When a parsing unit has performed the parsing operation for a strip it writes a pointer into the strip pointer array 130 at a position corresponding to the first macroblock of that strip. The pointer points to the strip descriptor generated for that strip as part of the parsing process. FIG. 3B schematically illustrates with an "X" the locations in the strip pointer array where pointers are stored as a result of the parsing operations carried out for the video picture shown in FIG. 3A. In this embodiment, where a new strip is started for each row and for any new slice, these positions are at the beginning of each row and at the macroblock positions where a new slice starts within a row.

The provision of an array position (see FIG. 3B) corresponding to each macroblock position (see FIG. 3A) means that multiple parsing units can update different regions of the array in parallel with one another, without the need for locks (e.g. on a row-by-row basis). Furthermore, although the strip pointer array 130 could in principle occupy a relatively larger amount of memory than a prior art row-based approach, the fact that (as can be seen in FIG. 3B) the array need only be relatively sparsely populated, means that the number of entries that will typically be written to/read from is modest. In consequence the data bandwidth (between the video processor and the memory) corresponding to these accesses, and therefore the power consumption, is nevertheless relatively small.

Figure 3C:
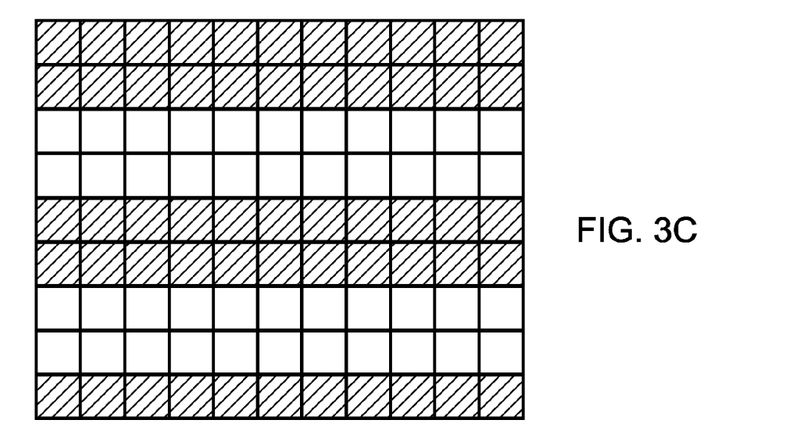
FIG. 3C schematically illustrates the paired row rendering carried out by a rendering unit in one embodiment.

Returning to FIG. 2, the rendering pipelines 140, 145 are configured to reference the strip pointer arrays 130 in order to determine the location of the intermediate format data which they require in order to render the pixel data for a given video picture. The throughput of the video decoding apparatus is enhanced by virtue of the fact that the rendering pipelines 140, 145 are able to render strips of the video picture as soon as a valid pointer appears at the starting macroblock of the next strip to be rendered. The strip descriptor pointed to by each strip pointer provides the width of the strip (i.e. the number of macroblocks which make up the strip) and therefore a rendering pipeline is able to determine where the next strip pointer is to be expected when the corresponding strip has been parsed. If no valid strip pointer is present at that location, then the rendering pipeline knows that the following strip is still in the process of being parsed and that it must wait for that parsing process to complete. In a typical implementation the rendering pipelines are configured to render two rows of macroblocks at a time (as schematically illustrated in FIG. 3C) due to the efficiency gains which this brings. Having generated the pixel data, the rendering pipelines write this pixel data to the frame buffer for display.

Figure 4:
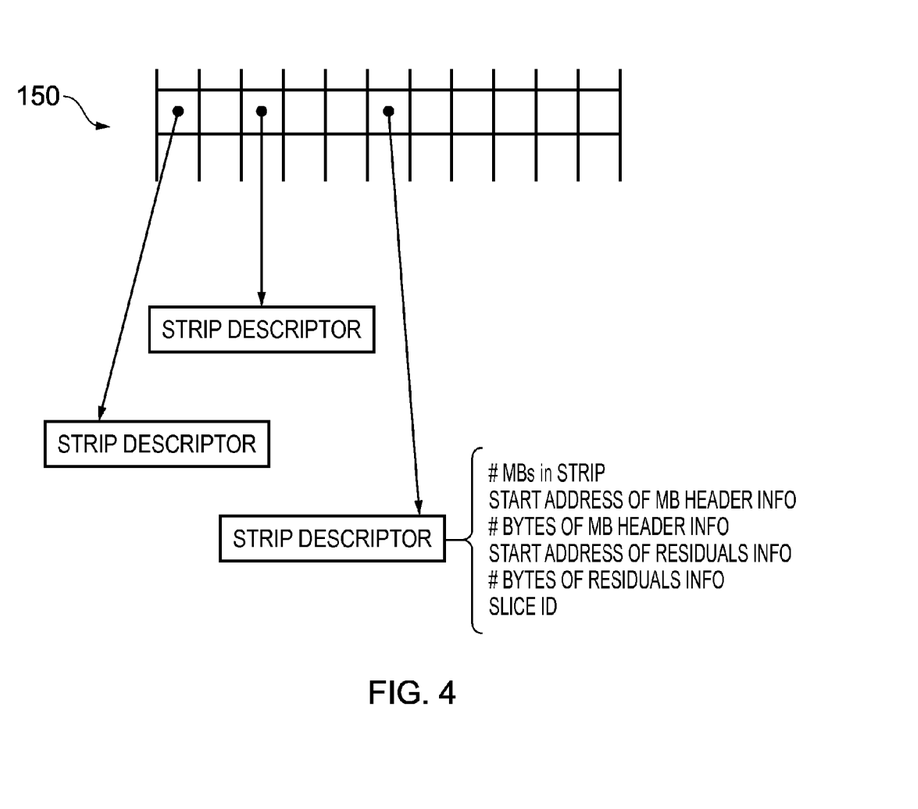
FIG. 4 schematically illustrates three pointers in the array pointing to respective strip descriptors which each provide information necessary for rendering the corresponding strip.

FIG. 4 schematically illustrates a single row 150 of a strip pointer array 130 wherein three pointer values are stored. With reference to FIG. 3A it can be seen that these pointers correspond to the last strip of slice 2, to the sole strip of slice 3, and to the first strip of slice 4. Each pointer points to a strip descriptor stored in memory which provides information required by the rendering unit to perform the rendering operation on each corresponding strip. As shown in FIG. 4 this comprises the number of macroblocks in that strip, the start address of the macroblock header information, the number of bytes of macroblock header information, the start address of the residuals information, the number of bytes of residual information and the slice ID.

Figure 5:
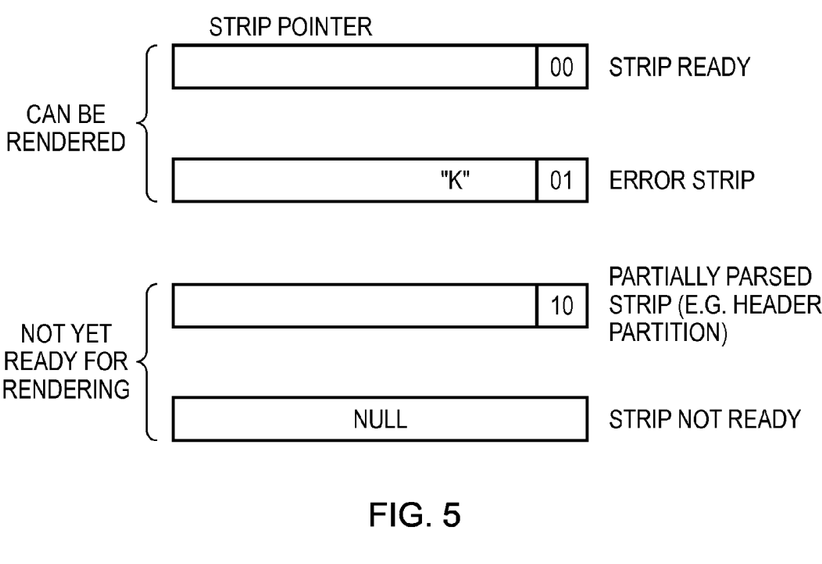
FIG. 5 schematically illustrates four different types of pointer which may be stored in the array in one embodiment.

Whilst, as explained above, the strip pointers stored in the strip pointer array are configured to point to the completed strip descriptors in memory, the entries in the strip pointer array can also be used to communicate other information related to the parsing of strips by the parsing units. This functionality is enabled by virtue of the fact that the strip pointers which point to completed strip descriptors in memory are configured to have a predetermined alignment in memory. In the embodiment discussed here this predetermined alignment is a 4-byte alignment, wherein a valid strip pointer which points to a completed strip descriptor in memory will have least significant bits (LSBs) of "00". Two significant advantages result from this configuration. Firstly, this enables other values stored in the strip pointer array which do not share the predetermined alignment to be used to indicate other status information related to the corresponding strip. For example, as illustrated in FIG. 5, whilst having LSBs of "00" indicates that the strip is ready to be rendered, other LSB pairs can communicate for example that an error has occurred during the parsing of this strip ("01") or that a data partitioned strip has been partially parsed ("10") (data partitioning is discussed in more detail below). A second advantage which results from this configuration is that the reader of the strip pointer array is able to determine status information about the corresponding strip without having to follow a pointer to its target elsewhere in memory.

Further information may also be conveyed via the pointer value itself. For example in the case of the "error pointer" (ending "01"), the higher orders bits of the pointer can be configured to indicate the number of macroblocks affected by the identified error condition. In the illustrated example embodiment a pointer value of (4*k)+1 is used to indicate that a strip of macroblocks of length "k" has been affected. The rendering units (pipelines) are correspondingly configured, when encountering such an error pointer, to perform an error concealment operation for the affected macroblocks. The particular form that this error concealment operation takes will depend on what is appropriate for the video being decoded. As shown in FIG. 5, the null pointer is also used by this example implementation to indicate that the strip is not yet ready for rendering. Hence the rendering unit encountering the null pointer knows that it must wait for this pointer to be updated before any rendering action can be taken for the corresponding strip.

Figure 6:
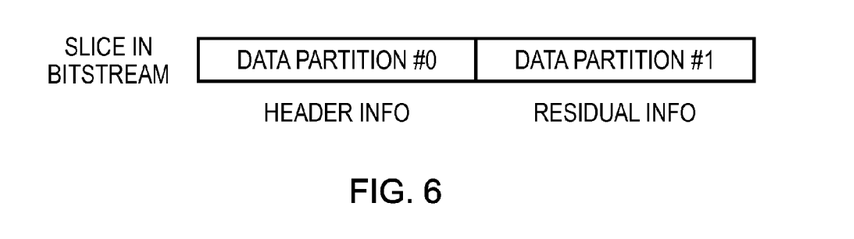
FIG. 6 schematically illustrates the sub-division of a slice into two data partitions.

In some encoded video bitstreams the data in a given slice may be partitioned. For example as schematically illustrated in FIG. 6, the encoded video data within a slice may be partitioned into a first data partition containing header information and a second data partition containing residual information. In such an example, the parsing units can be configured to update the corresponding strip pointer to indicate when the first partition has been parsed. This is shown in FIG. 5 by the example of the strip pointer having the LSB pair "10". This strip pointer indicates a partially complete strip descriptor in memory giving the partially parsed information (e.g. only the header information). Information about the partially parsed status of a strip is of particular benefit when there are parsing dependencies in the encoded video bitstream.

Figure 7:
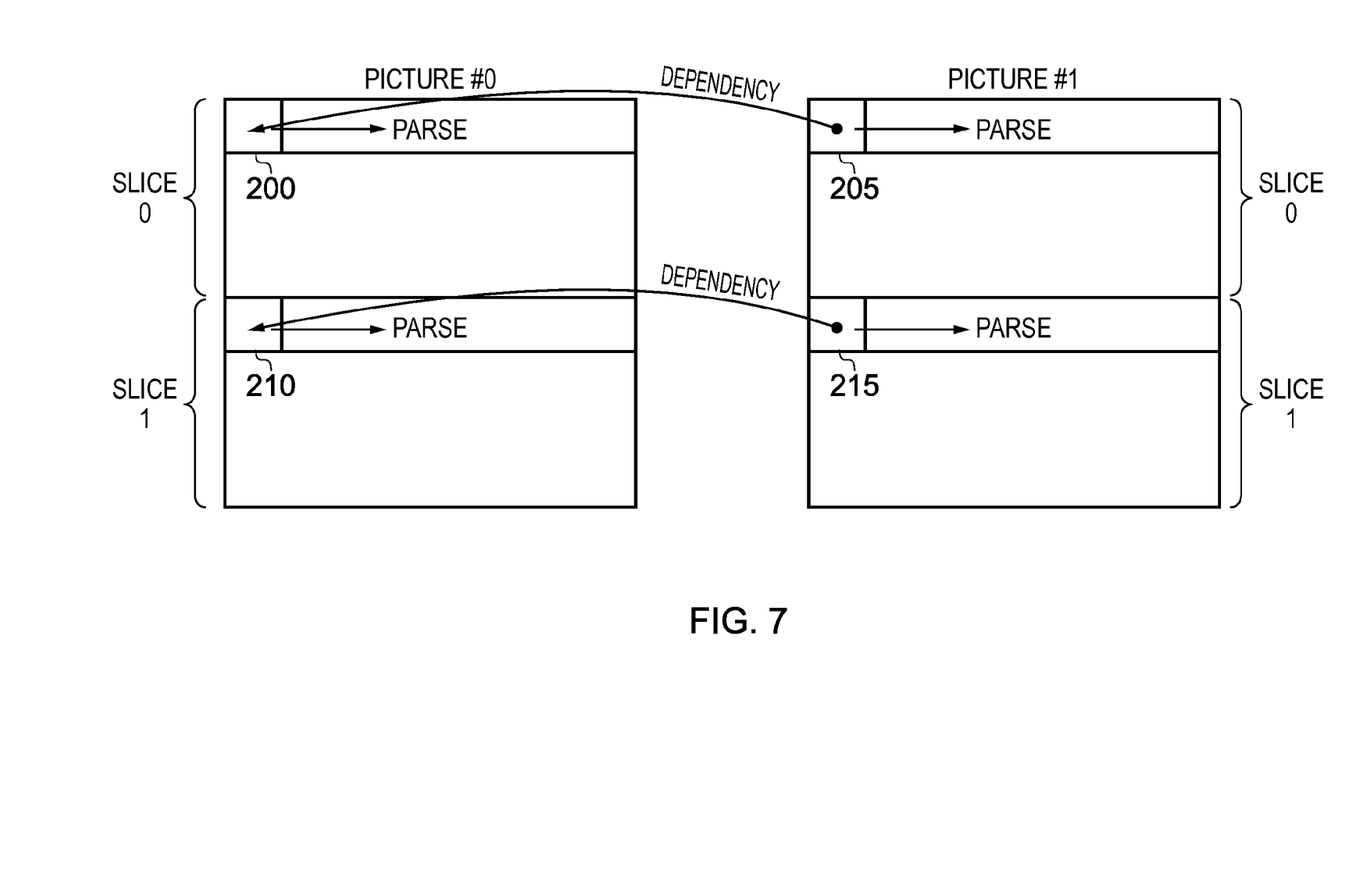
FIG. 7 schematically illustrates some parsing dependencies between consecutive pictures and slices in one embodiment.

Such parsing dependencies are schematically illustrated in FIG. 7, which shows two consecutive video pictures (picture #0 and picture #1), each of which is subdivided into two slices (slice 0 and slice 1). As illustrated, the macroblock 205 in slice 0 of picture #1 has a dependency on the macroblock 200 in slice 0 of picture #0, whilst the macroblock 215 in slice 1 of picture #1 has a dependency on the macroblock 210 in slice 1 of picture #0.

The present techniques (in particular the use of the strip pointer array) means that the parallelisation of the four parsing operations shown in FIG. 7 can be improved (for example in a 4-core embodiment of a video decoding apparatus such as that shown in FIG. 1), since as soon as a first parser has completed the parsing of the row containing macroblock 200, a second parser can commence parsing of macroblock 205, without say having to wait for the first parser to complete the entire slice to which macroblock 200 belongs, as would be the case in a typical prior art implementation. The same applies to the dependency between macroblocks 215 and 210. Furthermore, in prior art implementations which rely on a "y pointer" to indicate, on a row-wise basis, the extent of parsing of a given video picture, the parsing of macroblock 210 would not be able to begin until all of slice 0 in picture #0 had been parsed. Similarly, the parsing of macroblock 215 would not be able to begin until all of slice 0 in picture #1 had been parsed. However, the present techniques allow a parser to begin parsing macroblocks 200 and 210 in parallel with one another, and similarly to begin parsing macroblocks 205 and 215 in parallel with one another.

The parallelisation of the parsing processes is still further improved by the present techniques in the above-mentioned situation when a slice is data partitioned. Consider applying the example data partitioning illustrated in FIG. 6, in which a slice in the bitstream first presents the header information followed by the residual information, to the situation illustrated in FIG. 7. In this case the header information of macroblock 205 is dependent on the header information of macroblock 200. Hence, where the parser performing the parsing operation on macroblock 200 is configured to write a "partially parsed" status pointer such as that shown in FIG. 5 (i.e. with the LSB pair "10"), then the parser seeking to perform the parsing operation on macroblock 205 can read this "partially parsed" status pointer to determine the location in memory (from the partially complete strip descriptor) of the parsed header information for macroblock 200. Accordingly, rather than having to wait for complete parsing of macroblock 200, which only results after all the header macroblock information for slice 0 of picture #0 has been parsed, followed by the residual information for macroblock 200, parsing of the header information for macroblock 205 can commence as soon as the parsing of the header information for the row containing macroblock 200 is complete.

Figure 8:
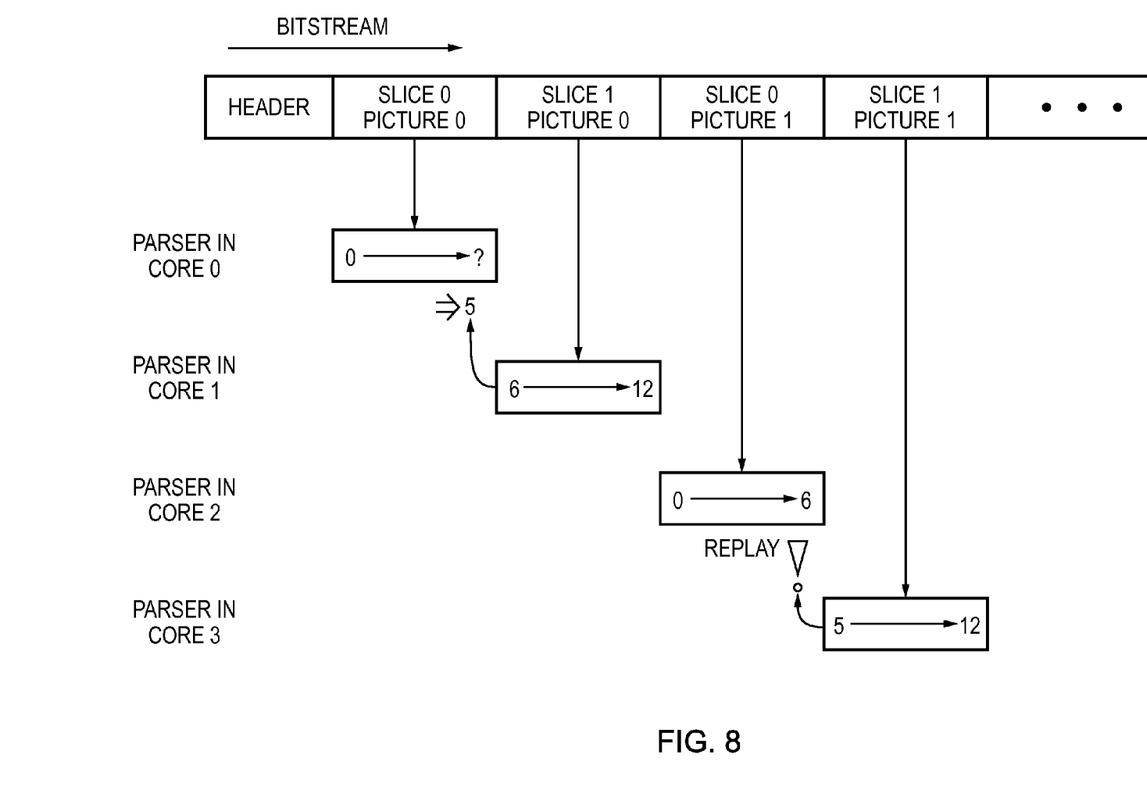
FIG. 8 schematically illustrates the allocation of slices in an encoded video bitstream for parsing by multiple parsing units in one embodiment, and the monitoring by a control unit of the boundaries between parsed slices.

FIG. 8 schematically illustrates the allocation of slices (such as those discussed with reference to FIG. 7) identified in the encoded video bitstream by the stream task (23 in FIG. 1) amongst four processor cores (22 in FIG. 1). As shown in FIG. 8, the four slices are each allocated to a separate parser (in a separate core) to maximise the parallelisation of the parsing process. Each parser is responsible for the parsing operation on its allocated slice, but the stream task acting as the overall "control unit" for this aspect of the video decoding apparatus is responsible for ensuring that the boundaries between identified slices correspond to one another in terms of the parsed data generated by each parser. To this end, the stream task receives task completion reports from each parser (see FIG. 2) which indicate to the stream task the result of parsing of each slice. The stream task is further configured to intervene if it is determined that a gap or an overlap will result from the separate parsing results of separate parsers.

In the example of a gap, where the task completion reports indicate that the last macroblock of a first slice does not immediately precede the first macroblock of a following slice, the stream task is configured to determine the number of macroblocks in this gap and to write an "error strip" pointer into the corresponding strip pointer array indicative of the size of the gap ("array entry adjustment" in FIG. 2). The rendering pipeline encountering this error strip can then perform an error concealment operation for this gap as appropriate.

In the example of an overlap, the action taken by the stream task depends on when this overlap is identified. In a first example illustrated in FIG. 8, the starting macroblock (at position "6") of slice 1 of picture 0 is reported to the stream task before the parser in core 0 has reached the end of slice 0 in a picture 0 and accordingly the stream task can intervene instruct the parser in core 0 to treat macroblock position "5" as the end of slice 0 in picture 0. In the second example illustrated in FIG. 8, the starting macroblock (at position "5") of slice 1 of picture 1 is reported to the stream task after the parser in core 2 has completed parsing slice 0 in a picture 1, indicating that macroblock position "6" was the end of slice 0 in picture 1. In this situation the stream task is configured to "replay" the rendering of the overlap between these slices (i.e. slices 0 and 1 in picture 1) in order to resolve this conflict, for example the slice which overran (i.e. slice 0 in picture 1) can be truncated or concealed with an error strip. This could for example involve re-rendering the entire earlier slice, or simply from the point at which the new slice takes over from the earlier slice.

Figure 9:
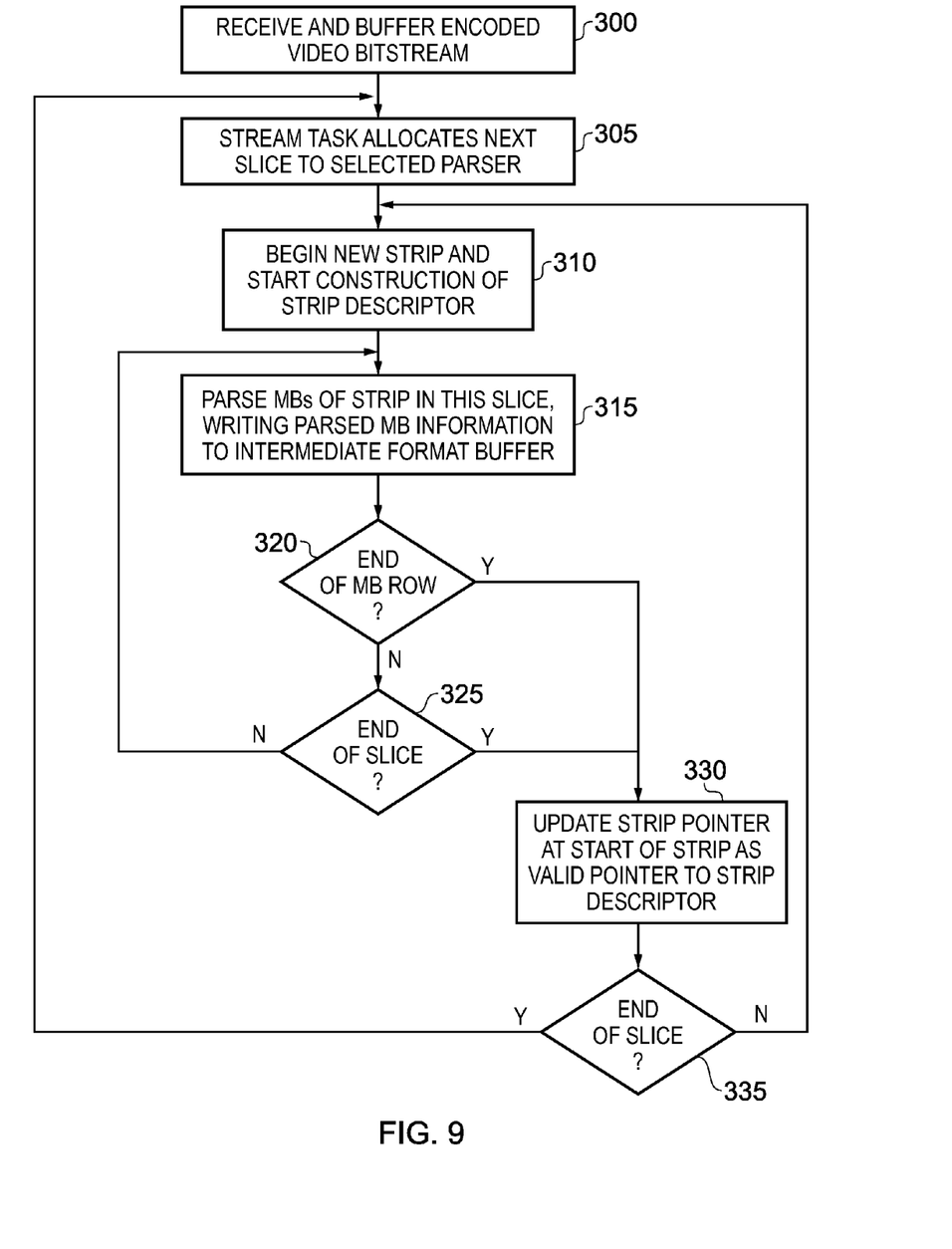
FIG. 9 schematically illustrates a series of steps taken in a video decoding apparatus in one embodiment when carrying out parsing operations.

FIG. 9 schematically illustrates a series of steps taken in a video decoding apparatus in one embodiment to carry out the required parsing operations. At step 300 the encoded video bitstream is received and buffered. Then at step 305, the stream task process allocates the next slice identified in the encoded video bitstream to a selected parser. The parser then begins a new strip and starts construction of a corresponding strip descriptor in memory at step 310. The parsing of this strip is performed on a macroblock by macroblock basis, with parsed macroblock information being written to the intermediate format buffer as it is generated (step 315). If (step 320) it is determined that the end of a macroblock row has been encountered then this represents the end of the current strip and the flow proceeds to step 330, where the array entry in the strip pointer array corresponding to the first macroblock of the current strip is updated to be a valid pointer to the strip descriptor constructed for this strip. Alternatively, if at step 320 it is determined that this is not the end of a macroblock row then it is determined at step 325 if the current macroblock represents the end of the current slice. If this is not the case then the flow returns to step 315 for further macroblocks in this strip to be parsed. If however the slice is at an end, then the flow proceeds to step 330, since the end of a slice is necessarily the end of a strip. Finally, having updated the strip pointer in the strip pointer array, at step 335 it is determined if this is the last strip in the current slice. It is not then the flow returns to step 310 for a new strip within this slice to be parsed, whereas if the slice is at an end in the flow returns to step 305 with the allocation of the next slice to the selected parser. It should be appreciated that the allocation of slices to parsers need not in fact wait for the parsing of proceeding slices to complete but rather slices will typically be queued as pending tasks for parsers, and hence when returning to step 305 the next queued slice will be parsed.

Figure 10:
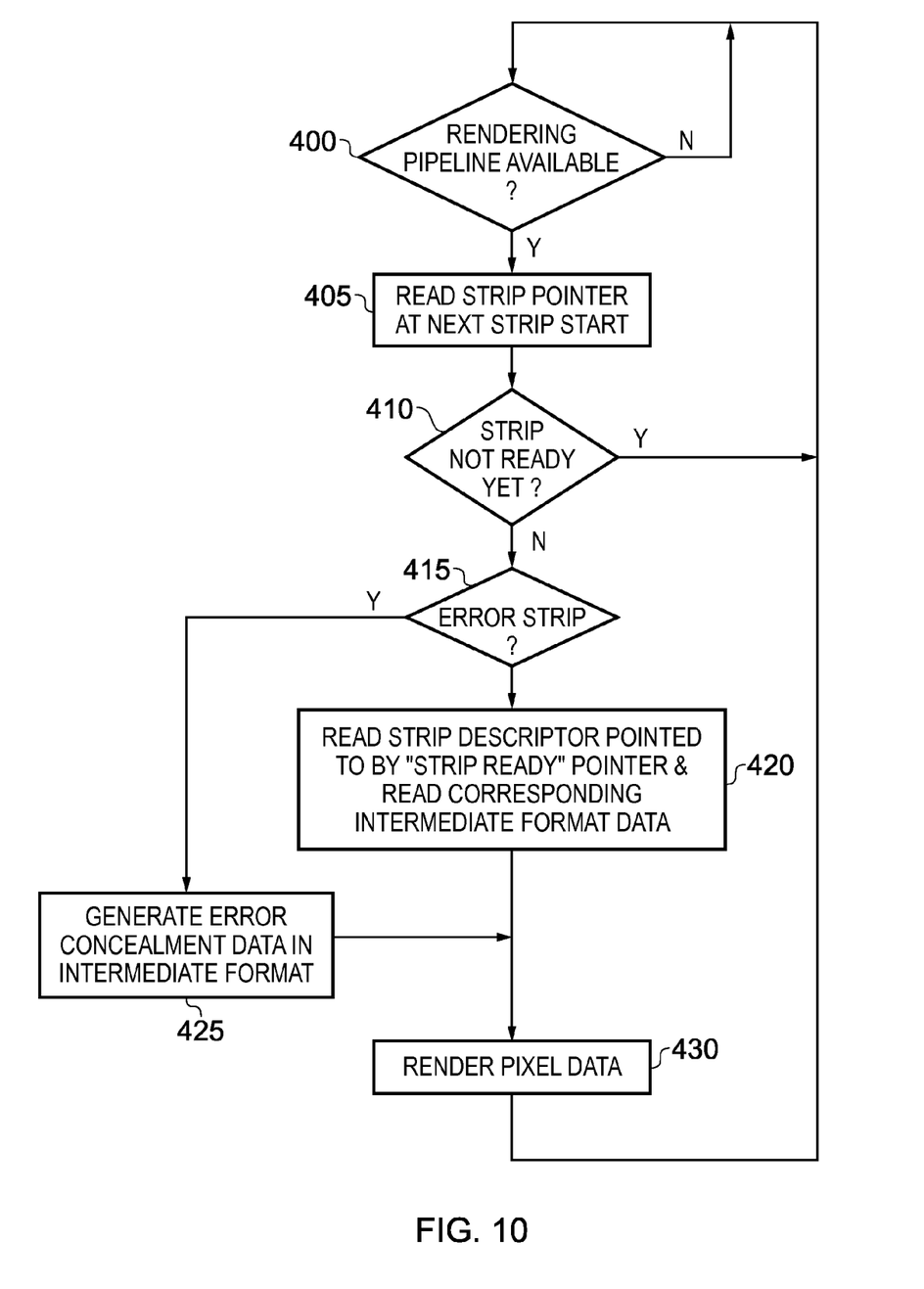
FIG. 10 schematically illustrates a series of steps taken in a video decoding apparatus in one embodiment when carrying out rendering operations.

FIG. 10 schematically illustrates a series of steps taken in a video decoding apparatus in one embodiment to carry out the required rendering operations. At step 400 once a rendering pipeline is available, the flow proceeds to step 405 where the rendering pipeline reads the strip pointer array, in particular reading the strip pointer at the next identified strip starting position. This strip starting position is determined on a rolling basis from the starting position of the preceding strip and its length. Then at step 410 if it is determined that the strip pointer indicates that the strip is not yet ready for rendering, either because a null pointer is stored at that array entry, or because the pointer indicates that the strip has only been partially parsed, then the flow loops back to step 400 and the rendering pipeline waits (periodically re-reading the strip pointer) until the strip is ready for rendering. Once the strip pointer indicates that the strip is ready for rendering, the flow proceeds to step 415 at which it is determined if the pointer indicates an error strip. If it does then flow proceeds to step 425 where the information about the required error concealment (e.g. the number of macroblocks to which this must be applied) is used to generate corresponding intermediate format data ready for rendering. If it does not then this flow proceeds to step 420 where the rendering unit follows the pointer to the strip descriptor for this strip and on the basis of the information given by the strip descriptor retrieves the corresponding intermediate format data required for rendering this strip. Finally at step 430 the pixel data is rendered by the rendering unit(s) and provided to the frame buffer for display.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A video decoding apparatus for decoding an encoded video bitstream, said encoded video bitstream representing a sequence of video pictures, wherein at least one video picture of said sequence of video pictures is encoded in said encoded video bitstream in a plurality of slices, wherein each slice comprises a sequence of raster scan order blocks which can be decoded independently of another slice, said video decoding apparatus comprising:

an array store configured to store an array of values, said array comprising an array entry corresponding to each block position in said at least one video picture, such that each block position has its own corresponding array entry;

a plurality of parsing circuits, each parsing circuit configured to perform a parsing operation on a selected sequence of raster scan order blocks in a selected slice and to write a value to a selected array entry in said array corresponding to a first block in said selected sequence, said value indicating a location of parsed data generated by said parsing operation and required to render said selected sequence of blocks; and a rendering circuit configured to render said video pictures using said parsed data with reference to said values written to said array store, wherein said plurality of parsing circuits are configured to perform their respective parsing operations on said plurality of slices in parallel with each other.

2. The video decoding apparatus as claimed in claim 1, wherein said value comprises a pointer configured to point to a strip descriptor, said strip descriptor comprising configuration information necessary to render said selected sequence of raster scan order blocks.

3. The video decoding apparatus as claimed in claim 2, wherein said strip descriptor indicates a width of said selected sequence of raster scan order blocks.

4. The video decoding apparatus as claimed in claim 2, wherein each parsing circuit is configured to generate said pointer having a predetermined alignment in memory space.

5. The video decoding apparatus as claimed in claim 4, wherein each parsing circuit is configured to generate an additional pointer for storage at said selected array entry in said array corresponding to said first block in said selected sequence, wherein said additional pointer has a byte offset from said predetermined alignment, wherein said byte offset is indicative of a status of said selected sequence.

6. The video decoding apparatus as claimed in claim 1, wherein said rendering circuit is configured to read said array in raster scan order and to begin performance of said rendering process on said selected sequence of raster scan order blocks after said value has been stored at said selected array entry in said array corresponding to said first block in said selected sequence.

7. The video decoding apparatus as claimed in claim 1, wherein each parsing circuit is configured to cause a selected value to be stored at said selected array entry in said array corresponding to said first block in said selected sequence, said selected value indicating that rendering of said selected sequence of raster scan order blocks cannot yet commence.

8. The video decoding apparatus as claimed in claim 7, wherein said rendering circuit is configured to read said array in raster scan order and, on reading said selected value, to wait until said value indicating said location of said parsed data is stored in said selected array entry in said array corresponding to said first block in said selected sequence.

9. The video decoding apparatus as claimed in claim 7, wherein said selected value is a null pointer.

10. The video decoding apparatus as claimed in claim 7, wherein each slice is partitioned into data partitions in said encoded video bitstream, and wherein each parsing circuit is configured, after having generated parsed data corresponding to a first data partition of said selected sequence of raster scan order blocks, to cause said selected value to indicate that only parsed data corresponding to said first data partition has been generated and stored.

11. The video decoding apparatus as claimed in claim 10, wherein at least one of said plurality of parsing circuits is configured to perform a dependent parsing operation which requires said parsed data corresponding to said first data partition, and wherein said at least one of said plurality of parsing circuits is configured to perform said dependent parsing operation only after said selected value indicates that said parsed data corresponding to said first data partition has been generated and stored.

12. The video decoding apparatus as claimed in claim 1, wherein at least one of said plurality of parsing circuits, is configured, if an error condition affecting at least one block occurs whilst performing said parsing operation, to cause an error value to be stored at an array entry in said array corresponding to a first erroneous block of said at least one block, said error value indicating how many blocks are erroneous.

13. The video decoding apparatus as claimed in claim 12, wherein said rendering circuit is configured to read said array in raster scan order and, on reading said error value, to perform an error concealment rendering process for said at least one block.

14. The video decoding apparatus as claimed in claim 1, wherein said rendering circuit is one of a plurality of rendering circuits, said plurality of rendering circuits configured to perform respective rendering processes in parallel with one another.

15. The video decoding apparatus as claimed in claim 1, further comprising a control circuit configured to allocate said plurality of slices between said plurality of parsing circuits.

16. The video decoding apparatus as claimed in claim 15, wherein said control circuit is configured to receive task completion reports from said plurality of parsing circuits and is configured, if said task completion reports indicate a gap between any of said plurality of slices, to cause an error value to be stored at an array entry in said array corresponding to a first block of said gap, said error value indicating how many blocks are in said gap.

17. The video decoding apparatus as claimed in claim 15, wherein said control circuit is configured to receive task completion reports from said plurality of parsing circuits and is configured, if said task completion reports indicate a starting position of a next slice overlaps with a previously parsed slice, to initiate a rendering correction procedure, said rendering correction procedure comprising causing said rendering circuit to render said previously parsed slice and said next slice so as to eliminate the overlap.

18. The video decoding apparatus as claimed in claim 1, wherein said parsed data generated by said parsing operation comprises intermediate format data, said video decoding apparatus further comprises an intermediate format data store into which each parsing circuit is configured to store said intermediate format data, and said rendering circuit is configured to render said video pictures using said intermediate format data retrieved from said intermediate format store.

19. A video decoding apparatus for decoding an encoded video bitstream, said encoded video bitstream representing a sequence of video pictures, wherein at least one video picture of said sequence of video pictures is encoded in said encoded video bitstream in a plurality of slices, wherein each slice comprises a sequence of raster scan order blocks which can be decoded independently of another slice, said video decoding apparatus comprising:
  array storage means for storing an array of values, said array comprising an array entry corresponding to each block position in said at least one video picture, such that each block position has its own corresponding array entry;
  a plurality of parsing means, each parsing means for performing a parsing operation on a selected sequence of raster scan order blocks in a selected slice and to write a value to a selected array entry in said array corresponding to a first block in said selected sequence, said value indicating a location of parsed data generated by said parsing operation and required to render said selected sequence of blocks; and
  rendering means for rendering said video pictures using said parsed data with reference to said values written to said array storage means,
  wherein said plurality of parsing means are configured to perform their respective parsing operations on said plurality of slices in parallel with each other.

20. A method of decoding an encoded video bitstream, said encoded video bitstream representing a sequence of video pictures, wherein at least one video picture of said sequence of video pictures is encoded in said encoded video bitstream in a plurality of slices, wherein each slice comprises a sequence of raster scan order blocks which can be decoded independently of another slice, said method comprising the steps of:
  storing an array of values in an array store, said array comprising an array entry corresponding to each block position in said at least one video picture, such that each block position has its own corresponding array entry;
  performing a parsing operation in each of a plurality of parsing processing units, said parsing operation being performed on a selected sequence of raster scan order blocks in a selected slice;
  writing a value to a selected array entry in said array corresponding to a first block in said selected sequence, said value indicating a location of parsed data generated by said parsing operation and required to render said selected sequence of blocks; and
  rendering said video pictures using said parsed data with reference to said values written to said array store,
  wherein said plurality of parsing processing units are configured to perform their respective parsing operations on said plurality of slices in parallel with each other.

* * * * *